(12) United States Patent
Kimba Dit Adamou et al.

(10) Patent No.: US 11,864,000 B2
(45) Date of Patent: *Jan. 2, 2024

(54) SIGNAL INTERFERENCE AVOIDANCE METHOD AND NETWORK DEVICE

(71) Applicant: VIVO MOBILE COMMUNICATION CO., LTD., Guangdong (CN)

(72) Inventors: Boubacar Kimba Dit Adamou, Chang'an Dongguan (CN); Dajie Jiang, Chang'an Dongguan (CN); Xueming Pan, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 90 days.

This patent is subject to a terminal disclaimer.

(21) Appl. No.: 17/750,178

(22) Filed: May 20, 2022

(65) Prior Publication Data

US 2022/0279358 A1  Sep. 1, 2022

Related U.S. Application Data

(63) Continuation of application No. 16/649,545, filed as application No. PCT/CN2018/105523 on Sep. 13, 2018, now Pat. No. 11,368,852.

(30) Foreign Application Priority Data

Nov. 3, 2017  (CN) .......................... 201711071955.6

(51) Int. Cl.
*H04W 16/14* (2009.01)
*H04W 76/16* (2018.01)
(Continued)

(52) U.S. Cl.
CPC ....... *H04W 16/14* (2013.01); *H04W 72/0446* (2013.01); *H04W 72/0453* (2013.01);
(Continued)

(58) Field of Classification Search
None
See application file for complete search history.

(56) References Cited

U.S. PATENT DOCUMENTS

2013/0301420 A1  11/2013  Zhang et al.
2015/0249947 A1   9/2015  Zhang et al.
(Continued)

FOREIGN PATENT DOCUMENTS

CN  104735790 A  6/2015
CN  105307178 A  2/2016
(Continued)

OTHER PUBLICATIONS

Intel Corporation, "Dual connectivity and in-device coexistence," 3GPP TSG RAN WG2 Meeting #86, R2-142043, pp. 1-3, (May 19-23, 2014).
(Continued)

*Primary Examiner* — Faruk Hamza
*Assistant Examiner* — Cassandra L Decker
(74) *Attorney, Agent, or Firm* — Maschoff Brennan

(57) ABSTRACT

A signal interference avoidance method includes, when the self-interference occurs for the UE connected concurrently to a first network device and a second network device, transmitting first interference avoidance indication information to the second network device. The first interference avoidance indication information is used to enable the second network device to communicate with the UE through a first time-domain resource and/or a first frequency-domain resource. The first interference avoidance indication information includes identification information about the UE.

20 Claims, 6 Drawing Sheets

(51) Int. Cl.

| | |
|---|---|
| *H04W 72/0446* | (2023.01) |
| *H04W 72/0453* | (2023.01) |
| *H04W 72/12* | (2023.01) |
| *H04W 88/08* | (2009.01) |
| *H04W 72/27* | (2023.01) |
| *H04W 72/541* | (2023.01) |
| *H04W 72/54* | (2023.01) |

(52) U.S. Cl.
CPC ....... *H04W 72/1215* (2013.01); *H04W 72/27* (2023.01); *H04W 72/541* (2023.01); *H04W 76/16* (2018.02); *H04W 88/08* (2013.01); *H04W 72/54* (2023.01)

(56) References Cited

U.S. PATENT DOCUMENTS

| | | |
|---|---|---|
| 2015/0327280 A1 | 11/2015 | Zhang et al. |
| 2016/0094358 A1 | 3/2016 | Won et al. |
| 2018/0013500 A1 | 1/2018 | Liao et al. |
| 2018/0091269 A1 | 3/2018 | Ratilainen et al. |
| 2020/0205146 A1 | 6/2020 | Takahashi et al. |

FOREIGN PATENT DOCUMENTS

| | | |
|---|---|---|
| CN | 103427855 B | 7/2016 |
| CN | 106230542 A | 12/2016 |
| JP | 2017-517935 A | 6/2017 |
| KR | 10-2016-0132060 A | 11/2016 |
| WO | 2015/171255 A1 | 11/2015 |

OTHER PUBLICATIONS

Intel Corporation, "Dual connectivity and in-device coexistence," 3GPP TSG RAN WG2 Meeting #87bis, R2-144143, pp. 1-6, (Oct. 6-10, 2014).
LG Electronics, "Handling of IDC problems for dual Connectivity," 3GPP TSG-RAN WG2 #87bis, R2-144490, pp. 1-3, (Oct. 6-10, 2014).
NEC Corporation, "UE assistance information in dual connectivity," 3GPP TSG RAN2 Meeting #87bis, R2-144497, pp. 1-5, (Oct. 6-10, 2014).
Vivo, "Solutions for UE self-interference ," 3GPP TSG RAN WG1 Meeting #90, R1-1712872, pp. 1-6, (Aug. 21-25, 2017).
Vivo, "On UE self-interference handling," 3GPP TSG RAN WH1 NR Ad Hoc #3, R1-1715650, Sep. 18, 2017.
Ericsson, "introducing 5G indication in LTE RRC SIB,," 3GPP TSG-RAN WG2 #99bis, R2-1710512, pp. 1-20, (Oct. 9-13, 2017).
Sony, "LTE-NR Coexistence," 3GPP TSG RAN WG2 Meeting #99bis, R2-1711018, pp. 1-9, (Oct. 9-13, 2017).
Written Opinion and International Search Report dated Dec. 5, 2018 as received in Application No. PCT/CN2018/105523.
CN First Office Action dated Apr. 8, 2020 as received in Application No. 201711071955.6.
CN Fourth Office Action dated Jan. 28, 2021 as received in Application No. 201711071955.6.
JP Second Office Action dated Mar. 28, 2022 as received in Application No. 2020-520138.
KR Second Office Action dated Jun. 4, 2021 as received in Application No. 10-2020-7015502.
IN Office Action dated Jun. 4, 2021 as received in Application No. 202027020287.
JP First Office Action dated Jul. 26, 2021 as received in Application No. 2020-520138.
U.S. Office Action dated Aug. 9, 2021 as received in U.S. Appl. No. 16/649,545.

SIGNAL INTERFERENCE AVOIDANCE METHOD AND NETWORK DEVICE

CROSS-REFERENCE TO RELATED APPLICATIONS

The present application claims the benefit of and is a continuation application of U.S. patent application Ser. No. 16/649,545, which is an application of PCT Application No. PCT/CN2018/105523 filed on Sep. 13, 2018, which claims a priority of the Chinese patent application No. 201711071955.6 filed on Nov. 3, 2017, which are incorporated herein by reference in their entirety.

TECHNICAL FIELD

The present disclosure relates to the field of communication technology, in particular to signal interference avoidance methods and network devices.

BACKGROUND

Currently, a Long Term Evolution (LTE) system and a 5$^{th}$-Generation (5G) New Radio (NR) system need to be tightly coupled to each other in a Dual Connectivity (DC) mode, as shown in FIG. 1. One system serves as a Master Node (MN), and the other system serves as a Secondary Node (SN). In the DC system, two cell groups are provided, i.e., a Master Cell Group (MCG) and a Secondary Cell Group (SCG). The MCG may include one Primary Cell (PCell) and one or more Secondary Cells (SCells). The SCG may include one Primary Secondary Cell (PSCell) and one or more SCells.

In terms of spectrum, an LTE Frequency Division Duplexing (FDD) spectrum of 1.8 GHz and an NR Time Division Duplexing (TDD) spectrum of 3.5 GHz may be adopted for the dual connectivity of the LTE system and the NR system. As shown in FIG. 2, when an uplink signal at a frequency of 1.8 GHz is transmitted by a User Equipment (UE), a downlink reception signal at a frequency of 3.5 GHz for the UE may be adversely affected by a second harmonic interference generated by the uplink signal at a frequency of 1.8 GHz, thereby such a phenomenon as self-interference may occur for the UE.

In addition, in a non-DC system consisting of, e.g., the 5G NR system of 1.8 GHz and a carrier aggregation system of 3.5 GHz, the downlink reception signal at a frequency of 3.5 GHz for the UE may be adversely affected by the secondary harmonic interference generated by the uplink signal at a frequency of 1.8 GHz, and such a phenomenon as self-interference may also occur for the UE. In an NR Supplemental Uplink (SUL) system where an SUL carrier is at a frequency of 1.8 GHz and an NR carrier is at a frequency of 3.5 GHz, the downlink reception signal at a frequency of 3.5 GHz for the UE may be adversely affected by the secondary harmonic interference generated by the uplink signal at a frequency of 1.8 GHz, and at this time the self-interference may also occur for the UE.

SUMMARY

In one aspect, the present disclosure provides in some embodiments a second network device, including a processor, a memory, and a computer program stored in the memory and executed by the processor, wherein the processor is configured to execute the computer program so as to implement a signal interference avoidance method, the signal interference avoidance method including: receiving first interference avoidance indication information from a first network device, the first interference avoidance indication information being transmitted by the first network device; and communicating with a UE through a first time-domain resource and/or a first frequency-domain resource in accordance with the first interference avoidance indication information. Specifically, the first interference avoidance indication information includes identification information about the UE. And subsequent to receiving the first interference avoidance indication information from the first network device, the signal interference avoidance method further includes: transmitting feedback information to the first network device with respect to the first interference avoidance indication information. The feedback information includes: (i) information indicating that the first interference avoidance indication information is rejected, (ii) a rejection cause, and (iii) interference avoidance suggestion information different from the first interference avoidance indication information. And the interference avoidance suggestion information includes at least one of the identification information about the UE, identification information about each cell where the UE is located, resource indication information about time-domain resources and/or frequency-domain resources for the UE in each cell, resource indication information about a second time-domain resource and/or a second frequency-domain resource, a start time of a communication with the UE through the second time-domain resource and/or the second frequency-domain resource, and a stop time of the communication with the UE through the second time-domain resource and/or the second frequency-domain resource.

In another aspect, the present disclosure provides in some embodiments a non-transitory computer-readable storage medium storing therein a computer program, wherein the computer program is executed by a processor of a first network device so as to implement a signal interference avoidance method, the signal interference avoidance method including: transmitting first interference avoidance indication information to a second network device, wherein the first interference avoidance indication information is used to enable the second network device to communicate with a UE through a first time-domain resource and/or a first frequency-domain resource. Specifically, the first interference avoidance indication information includes identification information about the UE. The signal interference avoidance method further includes: receiving feedback information from the second network device with respect to the first interference avoidance indication information. The feedback information includes: (i) information indicating that the first interference avoidance indication information is rejected, (ii) a rejection cause, and (iii) interference avoidance suggestion information different from the first interference avoidance indication information. And the interference avoidance suggestion information includes at least one of the identification information about the UE, identification information about each cell where the UE is located, resource indication information about time-domain resources and/or frequency-domain resources for the UE in each cell, resource indication information about a second time-domain resource and/or a second frequency-domain resource, a start time of a communication with the UE through the second time-domain resource and/or the second frequency-domain resource, and a stop time of the communication with the UE through the second time-domain resource and/or the second frequency-domain resource.

In yet another aspect, the present disclosure provides in some embodiments a non-transitory computer-readable storage medium storing therein a computer program, wherein the computer program is executed by a processor of a second network device so as to implement a signal interference avoidance method, the signal interference avoidance method including: receiving first interference avoidance indication information from a first network device, the first interference avoidance indication information being transmitted by the first network device; and communicating with a UE through a first time-domain resource and/or a first frequency-domain resource in accordance with the first interference avoidance indication information. Specifically, the first interference avoidance indication information includes identification information about the UE. And subsequent to receiving the first interference avoidance indication information from the first network device, the signal interference avoidance method further includes: transmitting feedback information to the first network device with respect to the first interference avoidance indication information. The feedback information includes: (i) information indicating that the first interference avoidance indication information is rejected, (ii) a rejection cause, and (iii) interference avoidance suggestion information different from the first interference avoidance indication information. And the interference avoidance suggestion information includes at least one of the identification information about the UE, identification information about each cell where the UE is located, resource indication information about time-domain resources and/or frequency-domain resources for the UE in each cell, resource indication information about a second time-domain resource and/or a second frequency-domain resource, a start time of a communication with the UE through the second time-domain resource and/or the second frequency-domain resource, and a stop time of the communication with the UE through the second time-domain resource and/or the second frequency-domain resource.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

A scheme in the embodiments of the present disclosure may be applied to various communication system, e.g., a Global System of Mobile communication (GSM), a Code Division Multiple Access (CDMA) system, a Wideband Code Division Multiple Access (WCDMA) system, a General Packet Radio Service (GPRS) system, an LTE system, or an NR system.

A UE may also be called as a mobile terminal, an access terminal, a user unit, a user station, a mobile station, a remote station, a remote terminal, a mobile device, a terminal, a wireless communication device, a user agent or a user device. The access terminal may be a cellular phone, a cordless phone, a Session Initiation Protocol (SIP) phone, a Wireless Local Loop (WLL) station, a Personal Digital Assistant (PDA), a handheld device or a computation device with a wireless communication function or the other processing device connected to a wireless modem, a vehicle-mounted device, a wearable device, a terminal device in a coming 5G network, or a terminal device in an evolved Public Land Mobile Network (PLMN) network.

A network device may be a device communicating with the UE, and it may be a Base Transceiver Station (BTS) in the GSM or the CDMA system, a Node B (NB) in the WCDMA system, an evolved Node B (eNB or eNodeB) or an access point in the LTE system, a vehicle-mounted device, a wearable device, a network device in the coming 5G network, or a network device in the evolved PLMN network.

Figure 3:
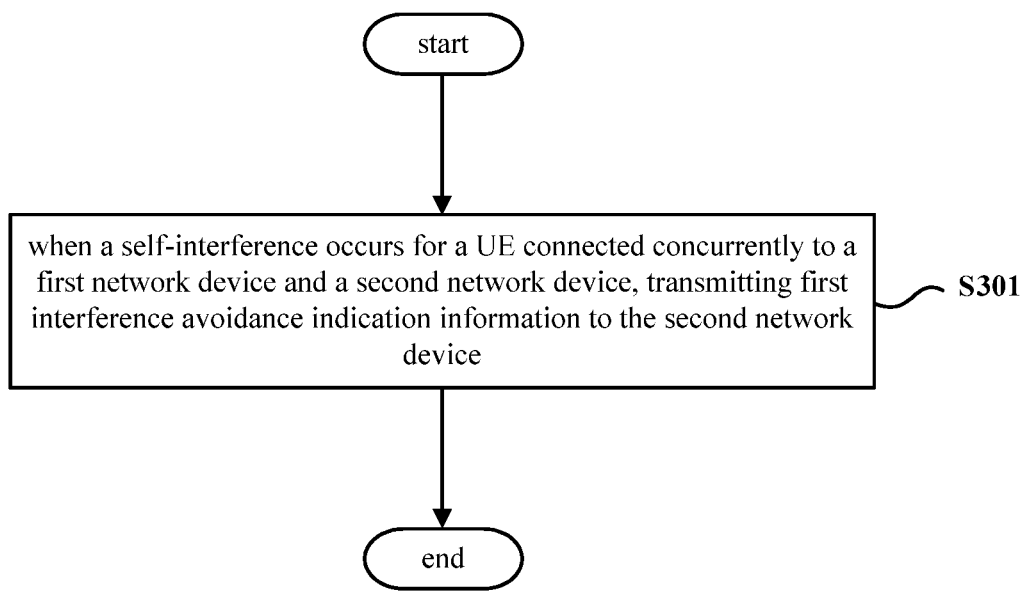
FIG. 3 is a flow chart of a signal interference avoidance method according to one embodiment of the present disclosure.

The present disclosure provides in some embodiments a signal interference avoidance method for a first network device which, as shown in FIG. 3, includes S301 of, when a self-interference occurs for a UE connected concurrently to the first network device and a second network device, transmitting first interference avoidance indication information to the second network device, so that the second network device communicates with the UE through a first time-domain resource and/or a first frequency-domain resource in accordance with the first interference avoidance indication information. The first time-domain resource and/or the first frequency-domain resource may be resources available for the second network device, and the first interference avoidance indication information may include identification information about the UE.

Figure 1:
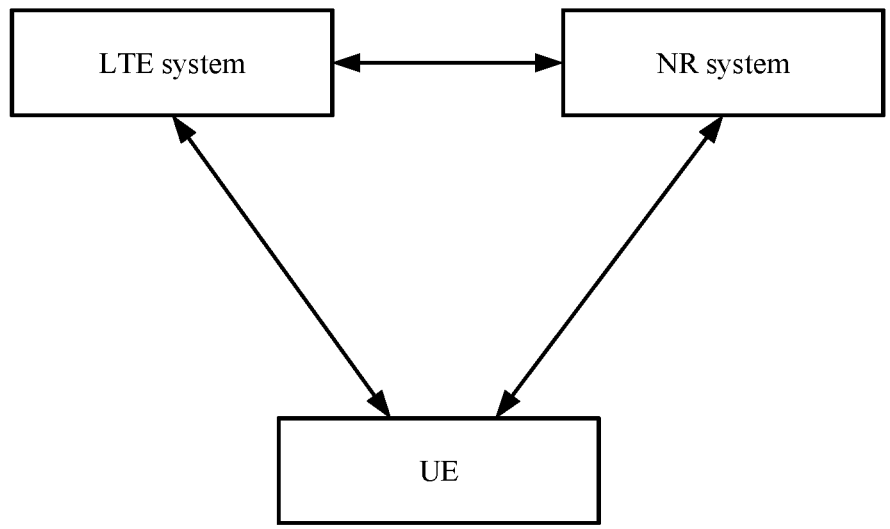
FIG. 1 is a schematic view showing a situation where a UE is connected to two network devices in a DC mode according to one embodiment of the present disclosure.
Figure 2:
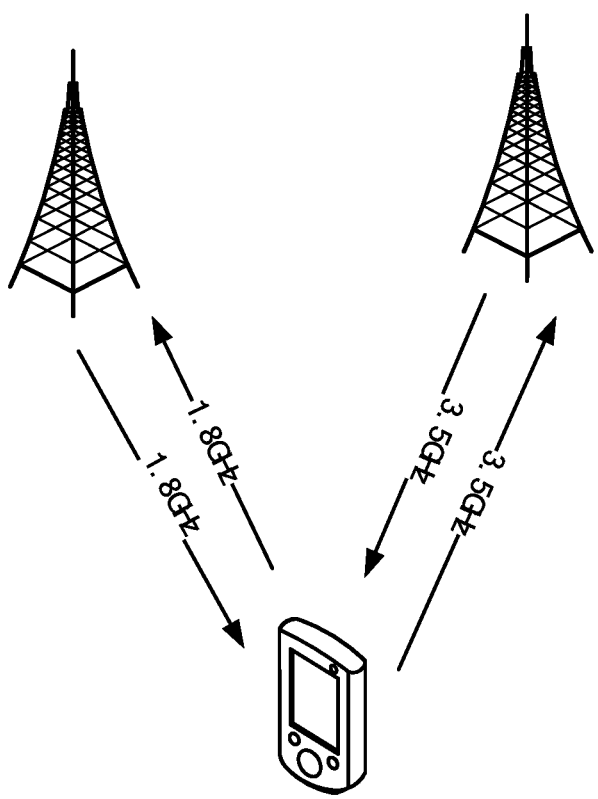
FIG. 2 is a schematic view showing signal transmission in a DC system according to one embodiment of the present disclosure.

In the embodiments of the present disclosure, the UE may be connected to the first network device and the second network device in a DC mode as shown in FIG. 1, and the UE, the first network device and the second network device may form a DC system.

In a possible embodiment of the present disclosure, the first network device and the second network device may each be an LTE base station or an NR base station, and the first network device may be different from the second network device. In other words, in the DC system in the embodiments of the present disclosure, the first network device may be the LTE base station while the second network device may be the NR base station, or the first network device may be the NR base station while the second network device may be the LTE base station.

In a possible embodiment of the present disclosure, the first network device may monitor whether the self-interference occurs for the UE, and when the self-interference occurs for the UE, transmit the first interference avoidance indication information to the second network device.

In the embodiments of the present disclosure, the time-domain resource may be slot, mini-slot, sub-frame or frame, and the frequency-domain resource may be a Physical Resource Block (PRB).

According to the embodiments of the present disclosure, when the self-interference occurs for the UE connected concurrently to the first network device and the second network device, the first network device may transmit the first interference avoidance indication information to the second network device, so that the second network device may communicate with the UE through the first time-domain resource and/or the first frequency-domain resource in accordance with the first interference avoidance indication information. As a result, it is able to effectively prevent the occurrence of the self-interference for the UE, thereby to improve the signal transmission quality.

The signal interference avoidance method will be described hereinafter in conjunction with the embodiments.

In a possible embodiment of the present disclosure, prior to the occurrence of the self-interference for the UE, resource indication information about a second time-domain resource and/or a second frequency-domain resource may be transmitted to the second network device. The second time-domain resource and/or the second frequency-domain resource may include resources available for the first network device and unavailable for the second network device, or resources available for the second network device and unavailable for the first network device, or resources available for both the first network device and the second network device.

In the embodiments of the present disclosure, apart from the identification information about the UE (e.g., information about an Identity (ID) of the UE), the first interference avoidance indication information may further include at least one of identification information about each cell where the UE is located (e.g., information about an ID of each cell or an identification code of each cell), resource indication information about time-domain resources and/or frequency-domain resources for the UE in the cell, a start time of the communication with the UE through the first time-domain resource and/or the first frequency-domain resource, and a stop time of the communication with the UE through the first time-domain resource and/or the first frequency-domain resource.

The time-domain resources and/or frequency-domain resources for the UE in the cells may be the same or different from each other. The UE may be located in one or more cells. When the time-domain resources and/or frequency-domain resources for the UE in the cells are the same, the first interference avoidance indication information may include common time-domain resources and/or common frequency-domain resources for the UE in at least one cell, and when the time-domain resources and/or frequency-domain resources for the UE in the cells are different from each other, the first interference avoidance indication information may include time-domain resources and/or frequency-domain resources for the UE in each of the at least one cell. The second network device may determine the time-domain resource and/or the frequency-domain resource for the communication with the UE in accordance with the time-domain resources and/or frequency-domain resources for the UE in each cell when the self-interference occurs for the UE.

For example, the resource indication information about the time-domain resource may be a bitmap including 40 bits, and each bit in the bitmap represents one downlink subframe or slot. When the bit has a value of 1, it indicates that the subframe or slot at a corresponding position may be used by the first network device for the downlink transmission, and when the bit has a value of 0, it indicates that the subframe or slot at the corresponding position may not be used by the first network device for the downlink transmission. A first bit in the bitmap represents a subframe #0 in a radio frame, and a system frame number of the radio frame mod 4 is equal to 0. A repetition period of the bitmap having 40 bits may be 40 ms.

For example, the resource indication information about the frequency-domain resource may be a bitmap, and each bit in the bitmap represents one PRB. When the bit has a value of 1, it indicates that the PRB at a corresponding position may be used by the first network device for the downlink transmission, and when the bit has a value of 0, it indicates that the PRB at the corresponding position may not be used by the first network device for the downlink transmission. A length of the bitmap may be related to a system bandwidth, e.g., it may be equal to the maximum quantity of PRBs of the system bandwidth.

When the first interference avoidance indication information includes the start time and the stop time of the communication with the UE through the first time-domain resource and/or the first frequency-domain resource, the start time is one minute after the transmission of the first interference avoidance indication information and the stop time is 40 ms after the first time-domain resource and/or the first frequency-domain resource start to be used, the second network device may start to communicate with the UE through the first time-domain resource and/or the first frequency-domain resource one minute after the reception of the first interference avoidance indication information, and stop the communication with the UE through the first time-domain resource and/or the first frequency-domain resource 40 ms later.

When the first interference avoidance indication information does not include the start time of the communication with the UE through the first time-domain resource and/or the first frequency-domain resource, the second network device may communicate with the UE through the first time-domain resource and/or the first frequency-domain resource immediately after the reception of the first interference avoidance indication information.

In a possible embodiment of the present disclosure, the second network device may transmit feedback information to the first network device with respect to the first interference avoidance indication information.

When the second time-domain resource and/or the second frequency-domain resource are resources merely available for the first network device, the second network device may reject to use the second time-domain resource and/or the second frequency-domain resource because it is impossible for the second network device to use the second time-domain resource and/or the second frequency-domain resource. At this time, the feedback information may include information indicating that the first interference avoidance indication information is rejected, and it may further include a rejection cause (e.g., the second time-domain resource and/or the second frequency-domain resource are unavailable).

When the feedback information includes the information indicating that the first interference avoidance indication information is rejected, it may further include interference avoidance suggestion information different from the first interference avoidance indication information. The interference avoidance suggestion information may include at least one of the identification information about the UE (e.g., the ID of the UE), the identification information about each cell where the UE is located (e.g., the ID or the identification code of each cell), the resource indication information about the time-domain resources and/or frequency-domain resources for the UE in each cell, resource indication information about a third time-domain resource and/or a third frequency-domain resource, a start time of the communication with the UE through the third time-domain resource and/or the third frequency-domain resource, and a stop time of the communication with the UE through the third time-domain resource and/or the third frequency-domain resource.

The time-domain resources and/or frequency-domain resources for the UE in the cells where the UE is located may be the same or different from each other. The UE may be located in one or more cells. When the time-domain resources and/or frequency-domain resources for the UE in the cells are the same, the first interference avoidance indication information may include common time-domain resources and/or common frequency-domain resources for the UE in at least one cell, and when the time-domain resources and/or frequency-domain resources for the UE in the cells are different from each other, the first interference avoidance indication information may include time-domain resources and/or frequency-domain resources for the UE in each of the at least one cell. The second network device may determine the time-domain resource and/or the frequency-domain resource for the communication with the UE in accordance with the time-domain resources and/or frequency-domain resources for the UE in each cell when the self-interference occurs for the UE. For example, the second network device may determine whether the third time-domain resource and/or the third frequency-domain resource indicated by the interference avoidance suggestion information are available in accordance with the time-domain resources and/or frequency-domain resources for the UE in each cell.

For example, the resource indication information about the time-domain resource may be a bitmap including 40 bits, and each bit in the bitmap represents one downlink subframe or slot. When the bit has a value of 1, it indicates that the subframe or slot at a corresponding position may be used by the first network device for the downlink transmission, and when the bit has a value of 0, it indicates that the subframe or slot at the corresponding position may not be used by the first network device for the downlink transmission. A first bit in the bitmap represents a subframe #0 in a radio frame, and a system frame number of the radio frame mod 4 is equal to 0. A repetition period of the bitmap having 40 bits may be 40 ms.

For example, the resource indication information about the frequency-domain resource may be a bitmap, and each bit in the bitmap represents one PRB. When the bit has a value of 1, it indicates that the PRB at a corresponding position may be used by the first network device for the downlink transmission, and when the bit has a value of 0, it indicates that the PRB at the corresponding position may not be used by the first network device for the downlink transmission. A length of the bitmap may be related to a system bandwidth, e.g., it may be equal to the maximum quantity of PRBs of the system bandwidth. The second network device may calculate the PRBs for the first network device affected by a secondary harmonic wave in accordance with a calculation equation for the secondary harmonic wave (e.g., $f2=2*f1$, where f2 represents a frequency affected by the secondary harmonic wave, and f1 represents a frequency where the secondary harmonic wave is generated) and a range of PRBs used by the second network device, so as to acquire the PRBs for the first network device not affected by the secondary harmonic wave as the PRBs used by the first network device for the downlink transmission.

When the second time-domain resource and/or second frequency-domain resource are resources available for the second network device, the feedback information may include information indicating that the first interference avoidance indication information is accepted. At this time, the second network device may determine the second time-domain resource and/or second frequency-domain resource as the available first time-domain resource and/or first frequency-domain resource, and communicate with the UE through the second time-domain resource and/or second frequency-domain resource.

In a possible embodiment of the present disclosure, when the feedback information include the information indicating that the first interference avoidance indication information is rejected and the interference avoidance suggestion information different from the first interference avoidance indication information, the first network device may further determine second interference avoidance indication information in accordance with the interference avoidance suggestion information. The second interference avoidance indication information may include at least one of resource indication information about a fourth time-domain resource and/or a fourth frequency-domain resource, and the resource indication information about the time-domain resources and/or frequency-domain resources for the UE in each cell.

The fourth time-domain resource and/or fourth frequency-domain resource may be determined in accordance with the resource indication information about the third time-domain resource and/or third frequency-domain resource in the interference avoidance suggestion information. For example, when there is a plurality of third time-domain resources, a part of available resources may be selected from the third time-domain resources as the fourth time-domain resources.

Then, the first network device may transmit the second interference avoidance indication information to the second network device, so that the second network device may communicate with the UE through the fourth time-domain resource and/or fourth frequency-domain resource.

Figure 4:
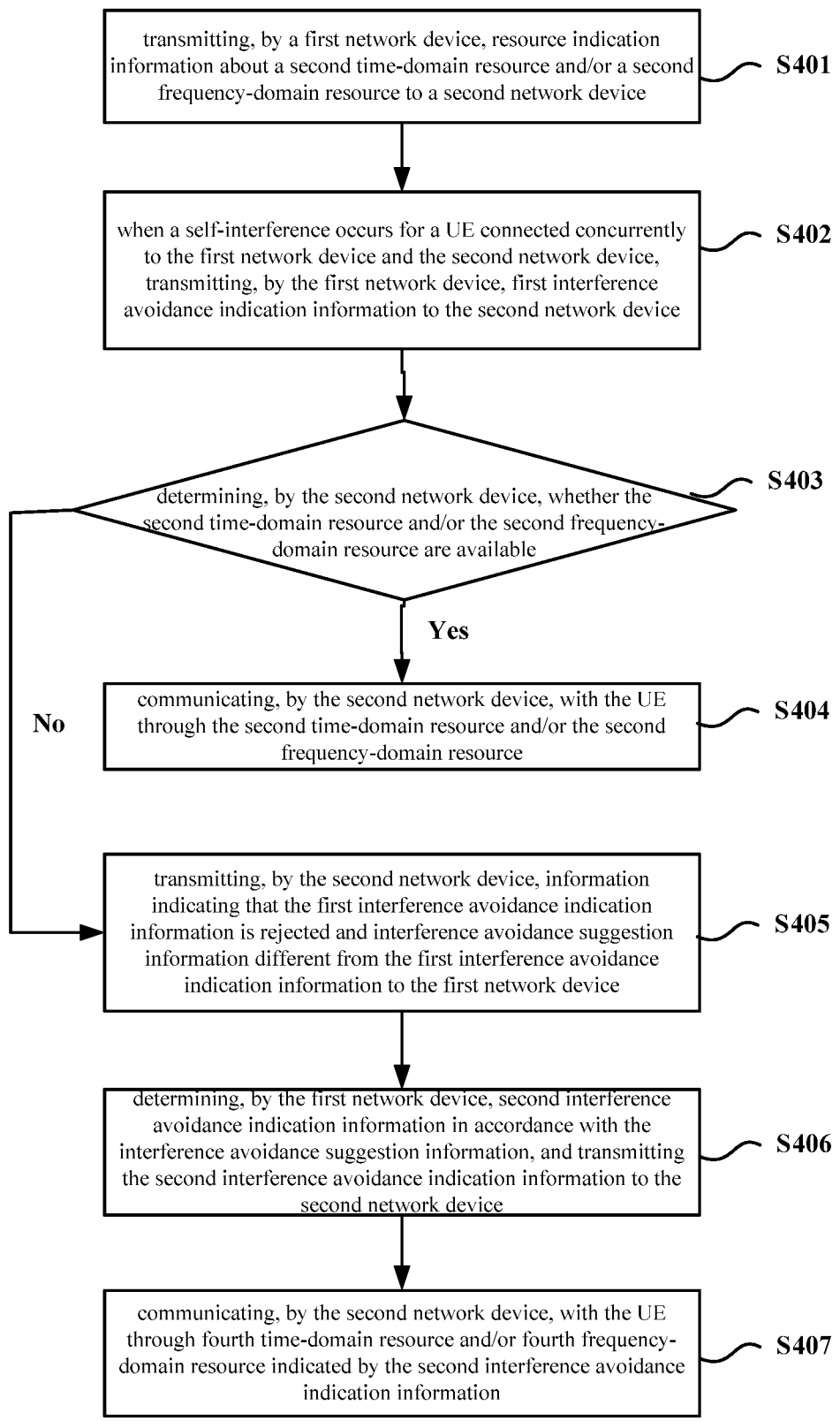
FIG. 4 is another flow chart of the signal interference avoidance method according to one embodiment of the present disclosure.

As shown in FIG. 4, the signal interference avoidance method may include the following steps.

S401: transmitting, by the first network device, the resource indication information about the second time-domain resource and/or second frequency-domain resource to the second network device.

S402: when the self-interference occurs for the UE connected concurrently to the first network device and the second network device, transmitting, by the first network device, the first interference avoidance indication information to the second network device.

The first interference avoidance indication information may include at least one of the identification information about the UE (e.g., the information about the ID of the UE), the identification information about each cell where the UE is located (e.g., the information about the ID of each cell, or the identification code of each cell), the resource indication information about the time-domain resources and/or frequency-domain resources for the UE in each cell, the start time of the communication with the UE through the first time-domain resource and/or the first frequency-domain resource, and the stop time of the communication with the UE through the first time-domain resource and/or the first frequency-domain resource.

S403: determining, by the second network device, whether the second time-domain resource and/or the second frequency-domain resource are available, if yes, proceeding to S404, and otherwise proceeding to S405.

S404: communication, by the second network device, with the UE through the second time-domain resource and/or the second frequency-domain resource.

S405: transmitting, by the second network device, the information indicating that the first interference avoidance indication information is rejected and the interference avoidance suggestion information different from the first interference avoidance indication information to the first network device.

The interference avoidance suggestion information may include at least one of the identification information about the UE (e.g., the information about the ID of the UE), the identification information about each cell where the UE is located (e.g., the information about the ID of each cell, or the identification code of each cell), the resource indication information about the time-domain resources and/or the frequency-domain resources for the UE in each cell, the resource indication information about the third time-domain resource and/or the third frequency-domain resource, the start time of the communication with the UE through the third time-domain resource and/or the third frequency-domain resource, and the stop time of the communication with the UE through the third time-domain resource and/or the third frequency-domain resource.

S406: determining, by the first network device, the second interference avoidance indication information in accordance with the interference avoidance suggestion information, and transmitting the second interference avoidance indication information to the second network device. The second interference avoidance indication information may include at least one of the resource indication information about the fourth time-domain resource and/or the fourth frequency-domain resource, and the resource indication information about the time-domain resources and/or the frequency-domain resources for the UE in each cell.

S407: communicating, by the second network device, with the UE through the fourth time-domain resource and/or the fourth frequency-domain resource indicated by the second interference avoidance indication information.

According to the embodiments of the present disclosure, the first network device may transmit in advance to the second network device the resources for the communication of the second network device with the UE when the self-interference occurs for the UE, and when the self-interference occurs for the UE, transmit the first interference avoidance indication information to the second network device. Hence, the second network device may determine the time-domain resources and/or frequency-domain resources for avoiding the self-interference for the UE in accordance with the first interference avoidance indication information, and communicate with the UE through the time-domain resources and/or frequency-domain resources. As a result, it is able to effectively prevent the self-interference for the UE, thereby to improve the signal transmission quality.

In a possible embodiment of the present disclosure, the first interference avoidance indication information may include the identification information about the UE (e.g., the information about the ID of the UE), and the resource indication information about the first time-domain resource and/or the first frequency-domain resource. In addition, the first interference avoidance indication information may further include at least one of the identification information about each cell where the UE is located (e.g., the information about the ID of each cell, or the identification code of each cell), the resource indication information about the time-domain resources and/or the frequency-domain resources for the UE in each cell, the start time of the communication with the UE through the first time-domain resource and/or the first frequency-domain resource, and the stop time of the communication with the UE through the first time-domain resource and/or the first frequency-domain resource.

The time-domain resources and/or frequency-domain resources for the UE in the cells may be the same or different from each other. The UE may be located in one or more cells. When the time-domain resources and/or frequency-domain resources for the UE in the cells are the same, the first interference avoidance indication information may include common time-domain resources and/or common frequency-domain resources for the UE in at least one cell, and when the time-domain resources and/or frequency-domain resources for the UE in the cells are different from each other, the first interference avoidance indication information may include time-domain resources and/or frequency-domain resources for the UE in each of the at least one cell. The second network device may determine the time-domain resource and/or the frequency-domain resource for the communication with the UE in accordance with the time-domain resources and/or frequency-domain resources for the UE in each cell when the self-interference occurs for the UE.

When the first interference avoidance indication information includes the start time and the stop time of the communication with the UE through the first time-domain resource and/or the first frequency-domain resource, the start time is one minute after the transmission of the first interference avoidance indication information and the stop time is 40 ms after the first time-domain resource and/or the first frequency-domain resource start to be used, the second network device may start to communicate with the UE through the first time-domain resource and/or the first frequency-domain resource one minute after the reception of the first interference avoidance indication information, and stop the communication with the UE through the first time-domain resource and/or the first frequency-domain resource 40 ms later.

When the first interference avoidance indication information does not include the start time of the communication with the UE through the first time-domain resource and/or the first frequency-domain resource, the second network device may communicate with the UE through the first time-domain resource and/or the first frequency-domain resource immediately after the reception of the first interference avoidance indication information.

In the embodiments of the present disclosure, the first interference avoidance indication information includes the resource indication information about the first time-domain resource and/or the first frequency-domain resource and it is transmitted by the first network device to the second network device after the self-interference occurs for the UE, so the first network device may determine the first time-domain resource and/or the first frequency-domain resource available for the second network device in advance.

In a possible embodiment of the present disclosure, the first network device may determine the first time-domain resource and/or the first frequency-domain resource as follows. At first, the first network device may determine a fifth time-domain resource and/or a fifth frequency-domain resource used by the second network device when the self-interference occurs for the UE, and then determine the first time-domain resource and/or the first frequency-domain resource in accordance with the fifth time-domain resource and/or the fifth frequency-domain resource. To be specific, a time-domain resource and/or a frequency-domain resource different from the fifth time-domain resource and/or the fifth frequency-domain resource may be determined as the first time-domain resource and/or the first frequency-domain resource, so as to prevent the occurrence of the self-interference for the UE. For example, when the fifth time-domain resource used by the second network device during the occurrence of the self-interference for the UE is a subframe 1, the other time-domain resource different from the subframe 1 may be determined as the first time-domain resource.

In a possible embodiment of the present disclosure, even when the first time-domain resource and/or first frequency-domain resource indicated by the first network device to the second network device are resources available for the second network device, the second network device may also transmit the feedback information to the first network device with respect to the first interference avoidance indication information.

In one case, the feedback information may include the information indicating that the first interference avoidance indication information is accepted, and at this time, the second network device may communicate with the UE through the first time-domain resource and/or the first frequency-domain resource.

In another case, the feedback information may include the information indicating that the first interference avoidance indication information is rejected, and at this time, the feedback information may further include a rejection cause. For example, the rejection cause may be that a payload of the second network device is too large to communicate with the UE through the first time-domain resource and/or the first frequency-domain resource.

Figure 5:
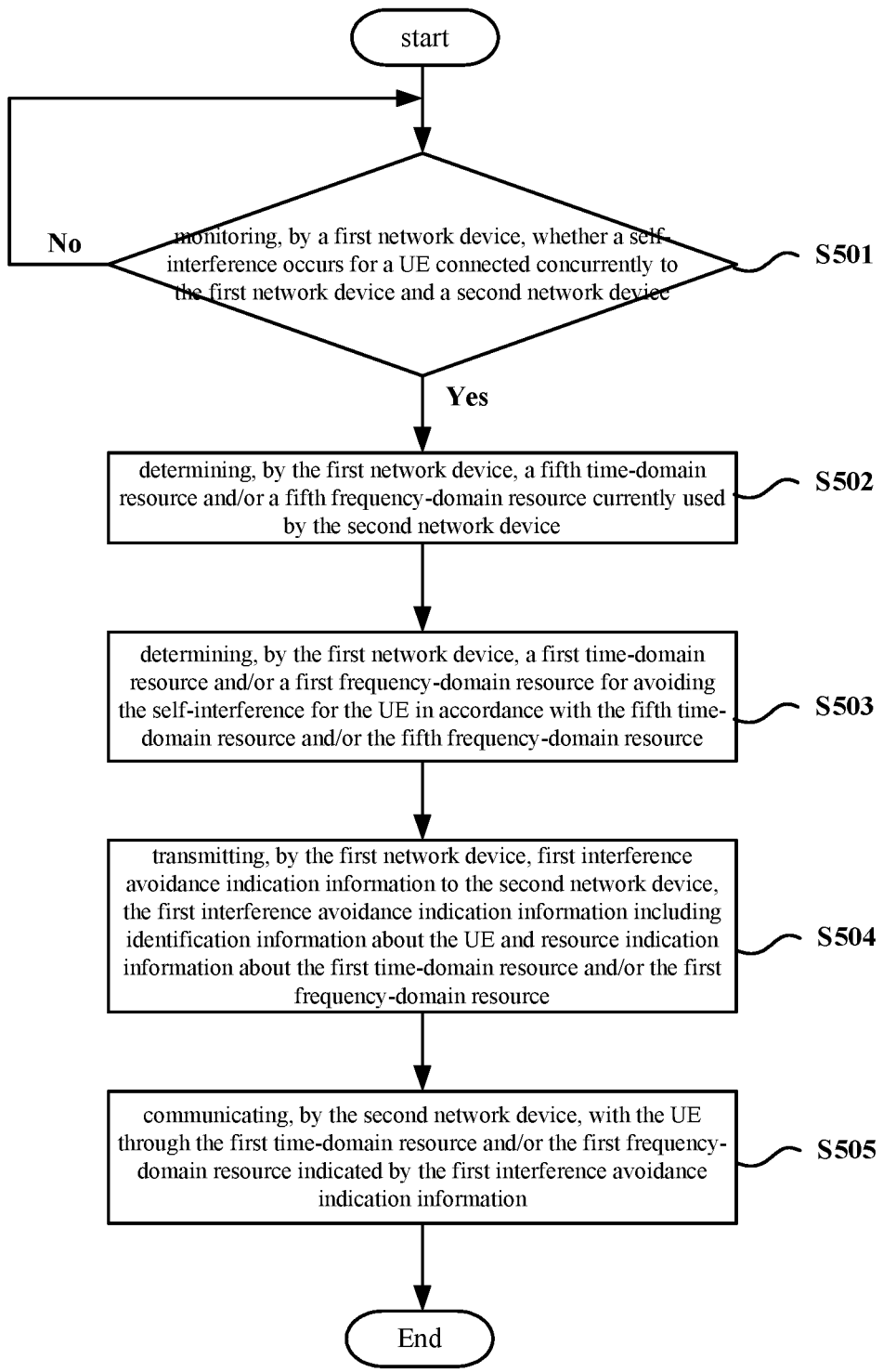
FIG. 5 is yet another flow chart of the signal interference avoidance method according to one embodiment of the present disclosure.

As shown in FIG. 5, the signal interference avoidance method may include the following steps.

S501: monitoring, by the first network device, whether the self-interference occurs for the UE connected concurrently to the first network device and the second network device, if yes, proceeding to S502, and otherwise, continuing to monitor whether the self-interference occurs for the UE.

S502: determining, by the first network device, the fifth time-domain resource and/or fifth frequency-domain resource currently used by the second network device.

S503: determining, by the first network device, the first time-domain resource and/or the first frequency-domain resource for avoiding the self-interference for the UE in accordance with the fifth time-domain resource and/or the fifth frequency-domain resource.

S504: transmitting, by the first network device, the first interference avoidance indication information to the second network device, the first interference avoidance indication information including the identification information about the UE and the resource indication information about the first time-domain resource and/or the first frequency-domain resource.

In addition, the first interference avoidance indication information may further include at least one of the identification information about each cell where the UE is located (e.g., the information about the ID of each cell, or the identification code of each cell), the resource indication information about the time-domain resources and/or frequency-domain resources for the UE in each cell, the start time of the communication with the UE through the first time-domain resource and/or the first frequency-domain resource, and the stop time of the communication with the UE through the first time-domain resource and/or the first frequency-domain resource.

S505: communicating, by the second network device, with the UE through the first time-domain resource and/or the first frequency-domain resource indicated by the first interference avoidance indication information.

In the embodiments of the present disclosure, when the self-interference occurs for the UE, the first network device may transmit the first interference avoidance indication information to the second network device, so that the second network device may communicate with the UE through the first time-domain resource and/or the first frequency-domain resource indicated by the first interference avoidance indication information. As a result, it is able to effectively prevent the occurrence of the self-interference for the UE, thereby to improve the signal transmission quality.

In the embodiments of the present disclosure, after the first network device has transmitted the first interference avoidance indication information to the second network device, when the self-interference for the UE disappears or is attenuated, the first network device may transmit avoidance interruption indication information to the second network device, so that the second network device may stop the communication with the UE through the first time-domain resource and/or the first frequency-domain resource in accordance with the avoidance interruption indication information.

Figure 6:
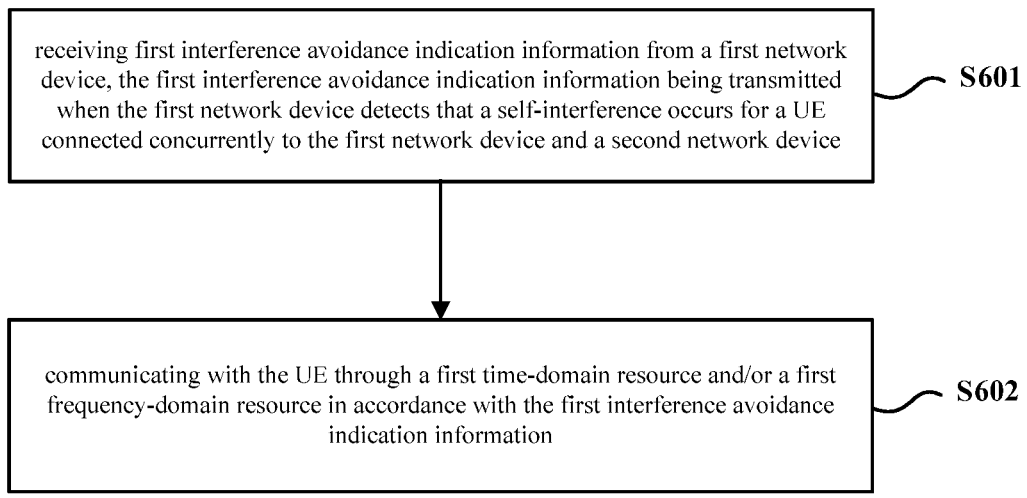
FIG. 6 is a flow chart of a signal interference avoidance method according to one embodiment of the present disclosure.

The present disclosure further provides in some embodiments a signal interference avoidance method for a second network device which, as shown in FIG. 6, includes: S601 of receiving first interference avoidance indication information from a first network device, the first interference avoidance indication information being transmitted when the first network device detects that a self-interference occurs for a UE connected concurrently to the first network device and the second network device; and S602 of communicating with the UE through a first time-domain resource and/or a first frequency-domain resource in accordance with the first interference avoidance indication information. The first interference avoidance indication information may include identification information about the UE.

In a possible embodiment of the present disclosure, prior to receiving the first interference avoidance indication information from the first network device, the second network device may receive resource indication information about a second time-domain resource and/or a second frequency-domain resource from the first network device.

The second time-domain resource and/or the second frequency-domain resource may include resources available for the first network device and unavailable for the second network device, or resources available for the second network device and unavailable for the first network device, or resources available for both the first network device and the second network device.

In a possible embodiment of the present disclosure, subsequent to receiving the first interference avoidance indication information from the first network device, the second network device may transmit feedback information to the first network device with respect to the first interference avoidance indication information.

When the second network device rejects to use the second time-domain resource and/or the second frequency-domain resource, the feedback information may include at least one of information indicating that the first interference avoidance indication information is rejected, a rejection cause, and interference avoidance suggestion information different from the first interference avoidance indication information.

The interference avoidance suggestion information may include at least one of the identification information about the UE, identification information about each cell where the UE is located, resource indication information about time-domain resources and/or frequency-domain resources for the UE in each cell, resource indication information about a third time-domain resource and/or a third frequency-domain resource, a start time of the communication with the UE through the third time-domain resource and/or the third frequency-domain resource, and a stop time of the communication with the UE through the third time-domain resource and/or the third frequency-domain resource.

When the second network device agrees to use the second time-domain resource and/or the second frequency-domain resource, the feedback information may include information indicating that the first interference avoidance indication information is accepted.

In a possible embodiment of the present disclosure, subsequent to transmitting the feedback information including the interference avoidance suggestion information to the first network device, the second network device may receive second interference avoidance indication information determined by the first network device in accordance with the interference avoidance suggestion information. The second interference avoidance indication information may include at least one of resource indication information about a fourth time-domain resource and/or a fourth frequency-domain resource, and the resource indication information about the time-domain resources and/or the frequency-domain resources for the UE in each cell. Then, the second network device may communicate with the UE through the fourth time-domain resource and/or the fourth frequency-domain resource in accordance with the second interference avoidance indication information.

In a possible embodiment of the present disclosure, the first interference avoidance indication information may further include resource indication information about the first time-domain resource and/or the first frequency-domain resource.

In a possible embodiment of the present disclosure, the first interference avoidance indication information may further include at least one of the identification information about each cell where the UE is located, the resource indication information about the time-domain resources and/or the frequency-domain resources for the UE in each cell, a start time of the communication with the UE through the first time-domain resource and/or the first frequency-domain resource, and a stop time of the communication with the UE through the first time-domain resource and/or the first frequency-domain resource.

In a possible embodiment of the present disclosure, upon the receipt of the avoidance interruption indication information from the first network device, the second network device may stop the communication with the UE through the first time-domain resource and/or the first frequency-domain resource.

According to the embodiments of the present disclosure, the second network device may receive the first interference avoidance indication information transmitted by the first network device when the self-interference occurs for the UE, and communicate with the UE through the first time-domain resource and/or the first frequency-domain resource in accordance with the first interference avoidance indication information. As a result, it is able to effectively prevent the occurrence of the self-interference for the UE, thereby to improve the signal transmission quality.

The implementation of the signal interference avoidance method for the second network device may refer to that of the method in FIGS. 3 to 5, which will not be particularly defined herein.

The specific embodiments have been described hereinabove, and the other embodiments shall also fall within the scope of the appended claims. In some cases, actions or steps in the appended claims may be performed in an order different from that mentioned in the embodiments so as to achieve a desired effect. In addition, the steps in the drawings are not necessarily required to be performed in the specific or sequential order as shown in the drawings so as to achieve the desired effect. In some embodiments of the present disclosure, multitasking and parallel processing may be applied or advantageous.

Figure 7:
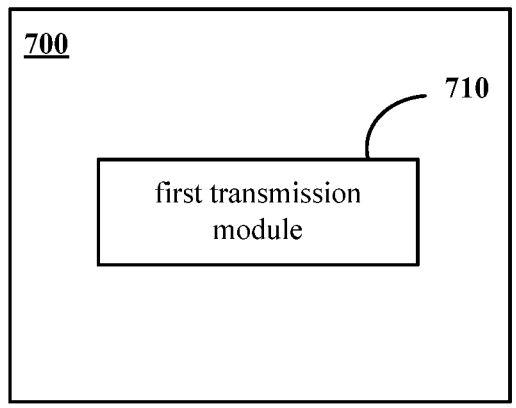
FIG. 7 is a schematic view showing a network device 700 according to one embodiment of the present disclosure.

The present disclosure further provides in some embodiments a network device 700 which, as shown in FIG. 7, includes a first transmission module 710 configured to, when a self-interference occurs for a UE connected concurrently to the network device 700 and a second network device, transmit first interference avoidance indication information to the second network device, so that the second network device communicates with the UE through a first time-domain resource and/or a first frequency-domain resource in accordance with the first interference avoidance indication information. The first interference avoidance indication information may include identification information about the UE.

In a possible embodiment of the present disclosure, the network device 700 may further include a second transmission module configured to, before the self-interference occurs for the UE, transmit resource indication information about a second time-domain resource and/or a second frequency-domain resource to the second network device.

In a possible embodiment of the present disclosure, the second time-domain resource and/or the second frequency-domain resource may be resources available for the network device and unavailable for the second network device, or resources available for the second network device and unavailable for the first network device, or resources available for both the first network device and the second network device.

In a possible embodiment of the present disclosure, the network device 700 may further include a reception module configured to receive feedback information from the second network device with respect to the first interference avoidance indication information. When the second network device rejects to use the second time-domain resource and/or the second frequency-domain resource, the feedback information may include at least one of information indicating that the first interference avoidance indication information is rejected, a rejection cause, and interference avoidance suggestion information different from the first interference avoidance indication information. The interference avoidance suggestion information may include at least one of the identification information about the UE, identification information about each cell where the UE is located, resource indication information about time-domain resources and/or frequency-domain resources for the UE in each cell, resource indication information about a third time-domain resource and/or a third frequency-domain resource, a start time of the communication with the UE through the third time-domain resource and/or the third frequency-domain resource, and a stop time of the communication with the UE through the third time-domain resource and/or the third frequency-domain resource. When the second network device agrees to use the second time-domain resource and/or the second frequency-domain resource, the feedback information may include information indicating that the first interference avoidance indication information is accepted.

In a possible embodiment of the present disclosure, the network device 700 may further include: a first determination module configured to, upon the receipt of the interference avoidance suggestion information, determine second interference avoidance indication information in accordance with the interference avoidance suggestion information, the second interference avoidance indication information including at least one of resource indication information about a fourth time-domain resource and/or a fourth frequency-domain resource, and the resource indication information about the time-domain resources and/or the frequency-domain resources for the UE in each cell; and a third transmission module configured to transmit the second interference avoidance indication information to the second network device, so that the second network device communicates with the UE through the fourth time-domain resource and/or the fourth frequency-domain resource in accordance with the second interference avoidance indication information.

In a possible embodiment of the present disclosure, the first interference avoidance indication information may further include resource indication information about the first time-domain resource and/or the first frequency-domain resource. The network device 700 may further include: a second determination module configured to, prior to transmitting the first interference avoidance indication information to the second network device, determine a fifth time-domain resource and/or a fifth frequency-domain resource used by the second network device when the self-interference occurs for the UE; and a third determination module configured to determine the first time-domain resource and/or the first frequency-domain resource in accordance with the fifth time-domain resource and/or the fifth frequency-domain resource.

In a possible embodiment of the present disclosure, the first interference avoidance indication information may further include at least one of the identification information about each cell where the UE is located, the resource indication information about the time-domain resources and/or the frequency-domain resources for the UE in each cell, a start time of the communication with the UE through the first time-domain resource and/or the first frequency-domain resource, and a stop time of the communication with the UE through the first time-domain resource and/or the first frequency-domain resource.

In a possible embodiment of the present disclosure, the network device 700 may further include a fourth transmission module configured to, subsequent to transmitting the first interference avoidance indication information to the second network device, when the self-interference for the UE disappears or is attenuated, transmit avoidance interruption indication information to the second network device, so that the second network device stops the communication with the UE through the first time-domain resource and/or the first frequency-domain resource in accordance with the avoidance interruption indication information.

The network device 700 in the embodiments of the present disclosure is capable of implementing the steps in the signal interference avoidance method for the first network device in FIGS. 3-5, which will not be particularly defined herein.

According to the embodiments of the present disclosure, when the self-interference occurs for the UE connected concurrently to the network device 700 and the second network device, the network device 700 may transmit the first interference avoidance indication information to the second network device, so that the second network device may communicate with the UE through the first time-domain resource and/or the first frequency-domain resource in accordance with the first interference avoidance indication information. As a result, it is able to effectively prevent the occurrence of the self-interference for the UE, thereby to improve the signal transmission quality.

Figure 8:
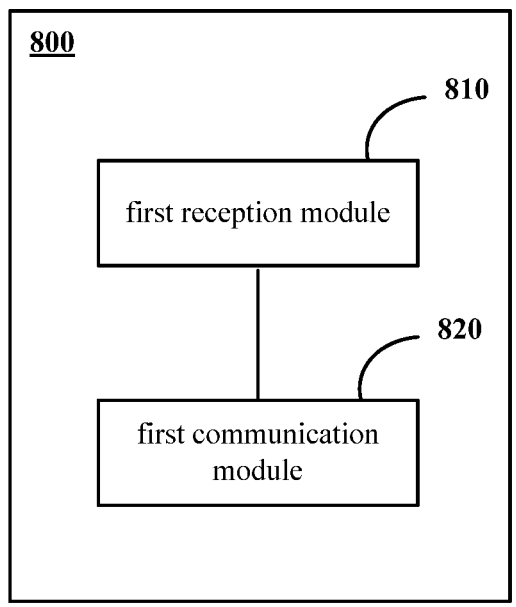
FIG. 8 is a schematic view showing a network device 800 according to one embodiment of the present disclosure.

The present disclosure further provides in some embodiments a network device 800 which, as shown in FIG. 8, includes: a first reception module 810 configured to receive first interference avoidance indication information from a first network device, the first interference avoidance indication information being transmitted by the first network device when a self-interference occurs for a UE connected concurrently to the first network device and the second network device; and a first communication module 820 configured to communicate with the UE through a first time-domain resource and/or a first frequency-domain resource in accordance with the first interference avoidance indication information. The first interference avoidance indication information may include identification information about the UE.

In a possible embodiment of the present disclosure, the network device 800 may further include a second reception module configured to, prior to receiving the first interference avoidance indication information from the first network device, receive resource indication information about a second time-domain resource and/or a second frequency-domain resource from the first network device.

In a possible embodiment of the present disclosure, the second time-domain resource and/or the second frequency-domain resource may include resources available for the first network device and unavailable for the network device, or resources available for the second network device and unavailable for the first network device, or resources available for both the first network device and the second network device.

In a possible embodiment of the present disclosure, the network device 800 may further include a transmission module configured to, subsequent to receiving the first interference avoidance indication information from the first network device, transmit feedback information to the first network device with respect to the first interference avoidance indication information. When the network device 800 rejects to use the second time-domain resource and/or the second frequency-domain resource, the feedback information may include at least one of information indicating that the first interference avoidance indication information is rejected, a rejection cause, and interference avoidance suggestion information different from the first interference avoidance indication information. The interference avoidance suggestion information may include at least one of the identification information about the UE, identification information about each cell where the UE is located, resource indication information about time-domain resources and/or frequency-domain resources for the UE in each cell, resource indication information about a third time-domain resource and/or a third frequency-domain resource, a start time of the communication with the UE through the third time-domain resource and/or the third frequency-domain resource, and a stop time of the communication with the UE through the third time-domain resource and/or the third frequency-domain resource. When the network device 800 agrees to use the second time-domain resource and/or the second frequency-domain resource, the feedback information may include information indicating that the first interference avoidance indication information is accepted.

In a possible embodiment of the present disclosure, the network device 800 may further include: a third reception module configured to, subsequent to transmitting the feedback information including the interference avoidance suggestion information to the first network device, receive second interference avoidance indication information determined by the first network device in accordance with the interference avoidance suggestion information, the second interference avoidance indication information including at least one of resource indication information about a fourth time-domain resource and/or a fourth frequency-domain resource, and the resource indication information about the time-domain resources and/or the frequency-domain resources for the UE in each cell; and a second communication module configured to communicate with the UE through the fourth time-domain resource and/or the fourth frequency-domain resource in accordance with the second interference avoidance indication information.

In a possible embodiment of the present disclosure, the first interference avoidance indication information may further include resource indication information about the first time-domain resource and/or the first frequency-domain resource.

In a possible embodiment of the present disclosure, the first interference avoidance indication information may further include at least one of the identification information about each cell where the UE is located, the resource indication information about the time-domain resources and/or the frequency-domain resources for the UE in each cell, a start time of the communication with the UE through the first time-domain resource and/or the first frequency-domain resource, and a stop time of the communication with the UE through the first time-domain resource and/or the first frequency-domain resource.

In a possible embodiment of the present disclosure, the network device 800 may further include a third communication module configured to, upon the receipt of the avoidance interruption indication information from the first network device, stop the communication with the UE through the first time-domain resource and/or the first frequency-domain resource.

The network device 800 in the embodiments of the present disclosure is capable of implementing the steps in the signal interference avoidance method for the second network device in FIG. 6, which will not be particularly defined herein.

According to the embodiments of the present disclosure, the network device 8000 may receive the first interference avoidance indication information transmitted by the first network device when the self-interference occurs for the UE, and then communicate with the UE through the first time-domain resource and/or the first frequency-domain resource in accordance with the first interference avoidance indication information. As a result, it is able to effectively prevent the occurrence of the self-interference for the UE, thereby to improve the signal transmission quality.

Figure 9:
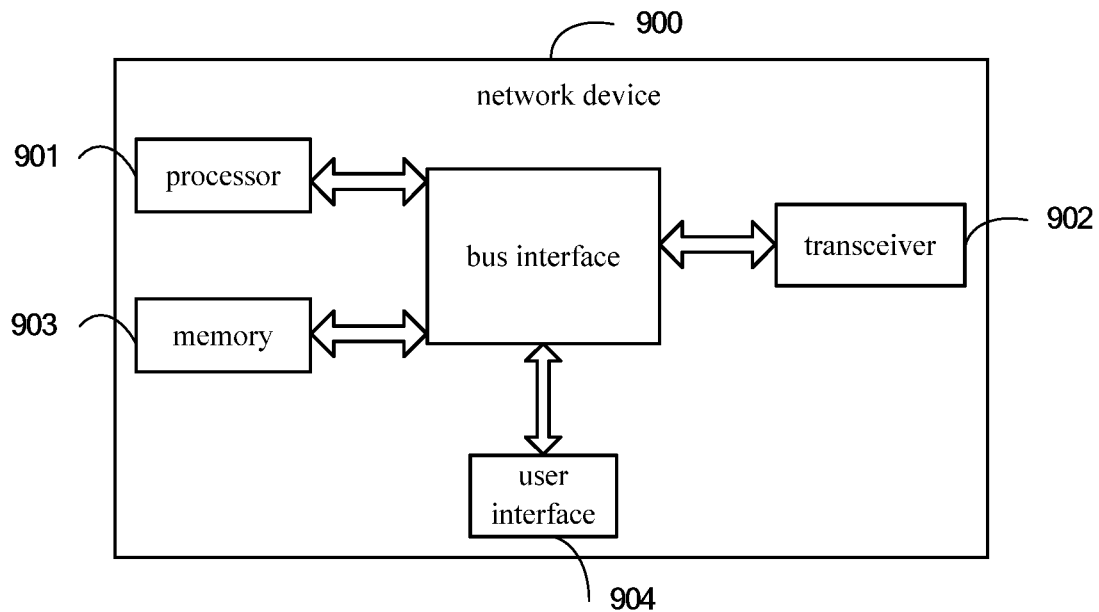
FIG. 9 is a schematic view showing the network device according to one embodiment of the present disclosure.

The present disclosure further provides in some embodiments a network device 900 capable of implementing the above-mentioned signal interference avoidance method with a same technical effect. As shown in FIG. 9, the network device 900 may include a processor 901, a transceiver 902, a memory 903, a user interface 904 and a bus interface.

In the embodiments of the present disclosure, the network device 900 may further include a computer program stored in the memory 903 and executed by the processor 901. The processor 901 is configured to execute the computer program so as to, when a self-interference occurs for a UE connected concurrently to the network device 900 and a second network device, transmit first interference avoidance indication information to the second network device, so that the second network device communicates with the UE through a first time-domain resource and/or a first frequency-domain resource in accordance with the first interference avoidance indication information. The first interference avoidance indication information may include identification information about the UE.

In FIG. 9, bus architecture may include a number of buses and bridges connected to each other, so as to connect various circuits for one or more processors 901 and one or more memories 903. In addition, as is known in the art, the bus architecture may be used to connect any other circuits, such as a circuit for a peripheral device, a circuit for a voltage stabilizer and a power management circuit. The bus interface may be provided, and the transceiver 902 may consist of a plurality of elements, i.e., a transmitter and a receiver for communication with any other devices over a transmission medium. With respect to different UEs, the user interface 904 may also be provided for devices which are to be arranged inside or outside the UE, and these devices may include but not limited to a keypad, a display, a speaker, a microphone and a joystick. The processor 901 may take charge of managing the bus architecture as well as general processings. The memory 903 may store therein data for the operation of the processor 901.

In a possible embodiment of the present disclosure, the processor 901 is further configured to execute the computer program so as to, before the self-interference occurs for the UE, transmit resource indication information about a second time-domain resource and/or a second frequency-domain resource to the second network device.

In a possible embodiment of the present disclosure, the second time-domain resource and/or the second frequency-domain resource may be resources available for the network device and unavailable for the second network device, or resources available for the second network device and unavailable for the first network device, or resources available for both the first network device and the second network device.

In a possible embodiment of the present disclosure, the processor 901 is further configured to execute the computer program so as to receive feedback information from the second network device with respect to the first interference avoidance indication information. When the second network device rejects to use the second time-domain resource and/or the second frequency-domain resource, the feedback information may include at least one of information indicating that the first interference avoidance indication information is rejected, a rejection cause, and interference avoidance suggestion information different from the first interference avoidance indication information. The interference avoidance suggestion information may include at least one of the identification information about the UE, identification information about each cell where the UE is located, resource indication information about time-domain resources and/or frequency-domain resources for the UE in each cell, resource indication information about a third time-domain resource and/or a third frequency-domain resource, a start time of the communication with the UE through the third time-domain resource and/or the third frequency-domain resource, and a stop time of the communication with the UE through the third time-domain resource and/or the third frequency-domain resource. When the second network device agrees to use the second time-domain resource and/or the second frequency-domain resource, the feedback information may include information indicating that the first interference avoidance indication information is accepted.

In a possible embodiment of the present disclosure, the processor 903 is further configured to execute the computer program so as to: upon the receipt of the interference avoidance suggestion information, determine second interference avoidance indication information in accordance with the interference avoidance suggestion information, the second interference avoidance indication information including at least one of resource indication information about a fourth time-domain resource and/or a fourth frequency-domain resource, and the resource indication information about the time-domain resources and/or the frequency-domain resources for the UE in each cell; and transmit the second interference avoidance indication information to the second network device, so that the second network device communicates with the UE through the fourth time-domain resource and/or the fourth frequency-domain resource in accordance with the second interference avoidance indication information.

In a possible embodiment of the present disclosure, the first interference avoidance indication information may further include resource indication information about the first time-domain resource and/or the first frequency-domain resource. The processor 901 is further configured to execute the computer program, so as to: prior to transmitting the first interference avoidance indication information to the second network device, determine a fifth time-domain resource and/or a fifth frequency-domain resource used by the second network device when the self-interference occurs for the UE; and determine the first time-domain resource and/or the first frequency-domain resource in accordance with the fifth time-domain resource and/or the fifth frequency-domain resource.

In a possible embodiment of the present disclosure, the first interference avoidance indication information may further include at least one of the identification information about each cell where the UE is located, the resource indication information about the time-domain resources and/or the frequency-domain resources for the UE in each cell, a start time of the communication with the UE through the first time-domain resource and/or the first frequency-domain resource, and a stop time of the communication with the UE through the first time-domain resource and/or the first frequency-domain resource.

In a possible embodiment of the present disclosure, the processor 901 is further configured to execute the computer program so as to, subsequent to transmitting the first interference avoidance indication information to the second network device, when the self-interference for the UE disappears or is attenuated, transmit avoidance interruption indication information to the second network device, so that the second network device stops the communication with the UE through the first time-domain resource and/or the first frequency-domain resource in accordance with the avoidance interruption indication information.

According to the embodiments of the present disclosure, when the self-interference occurs for the UE connected concurrently to the network device and the second network device, the network device may transit the first interference avoidance indication information to the second network device, so that the second network device may communicate with the UE through the first time-domain resource and/or the first frequency-domain resource in accordance with the first interference avoidance indication information. As a result, it is able to effectively prevent the occurrence of the signal interference in the DC system, thereby to improve the signal transmission quality.

Figure 10:
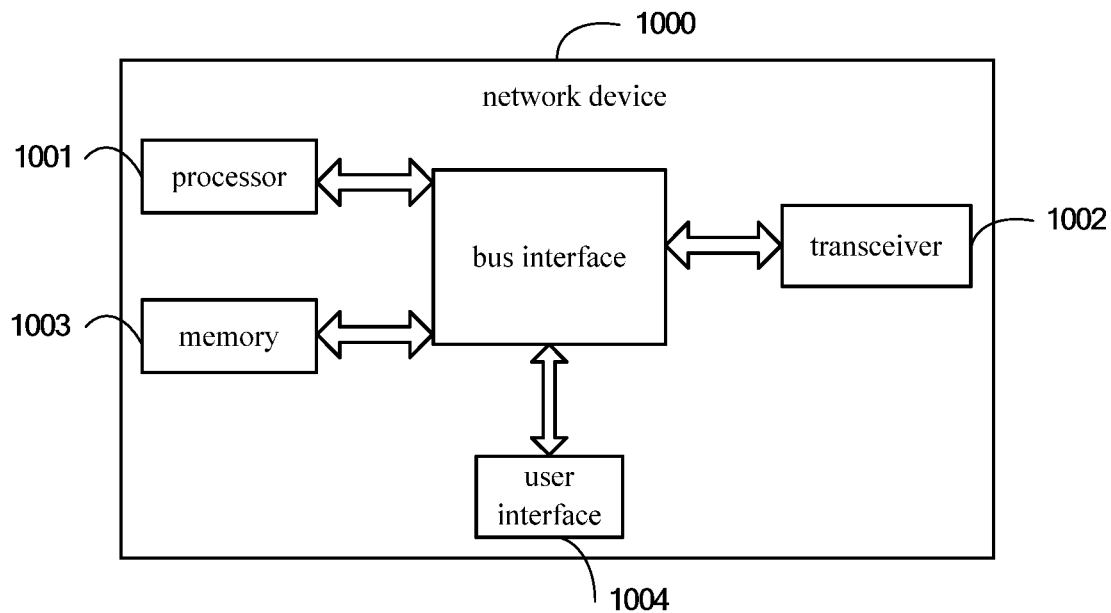
FIG. 10 is another schematic view showing the network device according to one embodiment of the present disclosure.

The present disclosure further provides in some embodiments a network device 1000 capable of implementing the above-mentioned signal interference avoidance method for the second network device with a same technical effect. As shown in FIG. 10, the network device 1000 may include a processor 1001, a transceiver 1002, a memory 1003, a user interface 1004 and a bus interface.

In the embodiments of the present disclosure, the network device 1000 may further include a computer program stored in the memory 1003 and executed by the processor 10001. The processor 1001 is configured to execute the computer program so as to: receive first interference avoidance indication information from a first network device, the first interference avoidance indication information being transmitted by the first network device when a self-interference occurs for a UE connected concurrently to the first network device and the network device 1000; and communicate with the UE through a first time-domain resource and/or a first frequency-domain resource in accordance with the first interference avoidance indication information. The first interference avoidance indication information may include identification information about the UE.

In FIG. 10, bus architecture may include a number of buses and bridges connected to each other, so as to connect various circuits for one or more processors 1001 and one or more memories 1003. In addition, as is known in the art, the bus architecture may be used to connect any other circuits, such as a circuit for a peripheral device, a circuit for a voltage stabilizer and a power management circuit. The bus interface may be provided, and the transceiver 1002 may consist of a plurality of elements, i.e., a transmitter and a receiver for communication with any other devices over a transmission medium. With respect to different UEs, the user interface 1004 may also be provided for devices which are to be arranged inside or outside the UE, and these devices may include but not limited to a keypad, a display, a speaker, a microphone and a joystick. The processor 1001 may take charge of managing the bus architecture as well as general processings. The memory 1003 may store therein data for the operation of the processor 1001.

In a possible embodiment of the present disclosure, the processor 1001 is further configured to execute the computer program so as to, prior to receiving the first interference avoidance indication information from the first network device, receive resource indication information about a second time-domain resource and/or a second frequency-domain resource from the first network device.

In a possible embodiment of the present disclosure, the second time-domain resource and/or the second frequency-domain resource may include resources available for the first network device and unavailable for the network device, or resources available for the second network device and unavailable for the first network device, or resources available for both the first network device and the second network device.

In a possible embodiment of the present disclosure, the processor 1001 is further configured to execute the computer program so as to, subsequent to receiving the first interference avoidance indication information from the first network device, transmit feedback information to the first network device with respect to the first interference avoidance indication information. When the network device 1000 rejects to use the second time-domain resource and/or the second frequency-domain resource, the feedback information may include at least one of information indicating that the first interference avoidance indication information is rejected, a rejection cause, and interference avoidance suggestion information different from the first interference avoidance indication information. The interference avoidance suggestion information may include at least one of the identification information about the UE, identification information about each cell where the UE is located, resource indication information about time-domain resources and/or frequency-domain resources for the UE in each cell, resource indication information about a third time-domain resource and/or a third frequency-domain resource, a start time of the communication with the UE through the third time-domain resource and/or the third frequency-domain resource, and a stop time of the communication with the UE through the third time-domain resource and/or the third frequency-domain resource. When the network device 1000 agrees to use the second time-domain resource and/or the second frequency-domain resource, the feedback information may include information indicating that the first interference avoidance indication information is accepted.

In a possible embodiment of the present disclosure, the processor 1001 is further configured to: subsequent to transmitting the feedback information including the interference avoidance suggestion information to the first network device, receive second interference avoidance indication information determined by the first network device in accordance with the interference avoidance suggestion information, the second interference avoidance indication information including at least one of resource indication information about a fourth time-domain resource and/or a fourth frequency-domain resource, and the resource indication information about the time-domain resources and/or the frequency-domain resources for the UE in each cell; and communicate with the UE through the fourth time-domain resource and/or the fourth frequency-domain resource in accordance with the second interference avoidance indication information.

In a possible embodiment of the present disclosure, the first interference avoidance indication information may further include resource indication information about the first time-domain resource and/or the first frequency-domain resource.

In a possible embodiment of the present disclosure, the first interference avoidance indication information may further include at least one of the identification information about each cell where the UE is located, the resource indication information about the time-domain resources and/or the frequency-domain resources for the UE in each cell, a start time of the communication with the UE through the first time-domain resource and/or the first frequency-domain resource, and a stop time of the communication with the UE through the first time-domain resource and/or the first frequency-domain resource.

In a possible embodiment of the present disclosure, the processor 1001 is further configured to execute the computer program so as to, upon the receipt of the avoidance interruption indication information from the first network device, stop the communication with the UE through the first time-domain resource and/or the first frequency-domain resource.

According to the embodiments of the present disclosure, the network device 1000 may receive the first interference avoidance indication information transmitted by the first network device when the self-interference occurs for the UE, and then communicate with the UE through the first time-domain resource and/or the first frequency-domain resource in accordance with the first interference avoidance indication information. As a result, it is able to effectively prevent the occurrence of the self-interference in the DC system, thereby to improve the signal transmission quality.

It should be appreciated that, in the context, such terms as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., Read-Only Memory (ROM)/Random Access Memory (RAM), magnetic disk or optical disk) and include several instructions so as to enable a terminal device (mobile phone, computer, server, air conditioner or network device) to execute the method in the embodiments of the present disclosure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A second network device, comprising a processor, a memory, and a computer program stored in the memory and executed by the processor, wherein the processor is configured to execute the computer program so as to implement a signal interference avoidance method, the signal interference avoidance method comprising:

receiving first interference avoidance indication information from a first network device, the first interference avoidance indication information being transmitted by the first network device; and communicating with a UE through a first time-domain resource and/or a first frequency-domain resource in accordance with the first interference avoidance indication information, wherein the first interference avoidance indication information comprises identification information about the UE, wherein subsequent to receiving the first interference avoidance indication information from the first network device, the signal interference avoidance method further comprises: transmitting feedback information to the first network device with respect to the first interference avoidance indication information;

wherein the feedback information comprises: (i) information indicating that the first interference avoidance indication information is rejected, (ii) a rejection cause, and (iii) interference avoidance suggestion information different from the first interference avoidance indication information; and wherein the interference avoidance suggestion information comprises at least one of the identification information about the UE, identification information about each cell where the UE is located, resource indication information about time-domain resources and/or frequency-domain resources for the UE in each cell, resource indication information about a second time-domain resource and/or a second frequency-domain resource, a start time of a communication with the UE through the second time-domain resource and/or the second frequency-domain resource, and a stop time of the communication with the UE through the second time-domain resource and/or the second frequency-domain resource.

2. The second network device according to claim 1, wherein prior to receiving the first interference avoidance indication information from the first network device, the signal interference avoidance method further comprises:

receiving resource indication information about a third time-domain resource and/or a third frequency-domain resource from the first network device.

3. The second network device according to claim 2, wherein the third time-domain resource and/or the third frequency-domain resource comprise resources available for the first network device and unavailable for the second network device, or resources available for the second network device and unavailable for the first network device, or resources available for both the first network device and the second network device.

4. The second network device according to claim 3, wherein when the second network device rejects the use of the third time-domain resource and/or the third frequency-domain resource, the feedback information comprise: (i) the information indicating that the first interference avoidance indication information is rejected, (ii) the rejection cause, and (iii) the interference avoidance suggestion information different from the first interference avoidance indication information.

5. The second network device according to claim 1, wherein subsequent to transmitting the feedback information comprising the interference avoidance suggestion information to the first network device, the signal interference avoidance method further comprises:

receiving second interference avoidance indication information determined by the first network device in accordance with the interference avoidance suggestion information, the second interference avoidance indication information comprising at least one of resource indication information about a fourth time-domain resource and/or a fourth frequency-domain resource, and resource indication information about time-domain resources and/or frequency-domain resources which are used by the UE in each cell; and communicating with the UE through the fourth time-domain resource and/or the fourth frequency-domain resource in accordance with the second interference avoidance indication information.

6. The second network device according to claim 1, wherein the first interference avoidance indication information further comprises resource indication information about the first time-domain resource and/or the first frequency-domain resource.

7. The second network device according to claim 6, wherein the first interference avoidance indication information further comprises at least one of the identification information about each cell where the UE is located, resource indication information about time-domain resources and/or frequency-domain resources which are used by the UE in each cell, a start time of the communication with the UE through the first time-domain resource and/or the first frequency-domain resource, and a stop time of the communication with the UE through the first time-domain resource and/or the first frequency-domain resource.

8. The second network device according to claim 1, wherein the signal interference avoidance method further comprising:

stopping the communication with the UE through the first time-domain resource and/or the first frequency-domain resource, upon the receipt of the avoidance interruption indication information from the first network device.

9. A non-transitory computer-readable storage medium storing therein a computer program, wherein the computer program is executed by a processor of a first network device so as to implement a signal interference avoidance method, the signal interference avoidance method comprising:

transmitting first interference avoidance indication information to a second network device, wherein the first interference avoidance indication information is used to enable the second network device to communicate with a UE through a first time-domain resource and/or a first frequency-domain resource, wherein the first interference avoidance indication information comprises identification information about the UE, wherein the signal interference avoidance method further comprises: receiving feedback information from the second network device with respect to the first interference avoidance indication information;

wherein the feedback information comprises: (i) information indicating that the first interference avoidance indication information is rejected, (ii) a rejection cause, and (iii) interference avoidance suggestion information different from the first interference avoidance indication information; and wherein the interference avoidance suggestion information comprises at least one of the identification information about the UE, identification information about each cell where the UE is located, resource indication information about time-domain resources and/or frequency-domain resources for the UE in each cell, resource indication information about a second time-domain resource and/or a second frequency-domain resource, a start time of a communication with the UE through the second time-domain resource and/or the second frequency-domain resource, and a stop time of the communication with the UE through the second time-domain resource and/or the second frequency-domain resource.

10. The non-transitory computer-readable storage medium according to claim 9, wherein the signal interference avoidance method further comprises:
transmitting resource indication information about a third time-domain resource and/or a third frequency-domain resource to the second network device, before the self-interference occurs for the UE.

11. The non-transitory computer-readable storage medium according to claim 10, wherein the third time-domain resource and/or the third frequency-domain resource are resources available for the first network device and unavailable for the second network device, or resources available for the second network device and unavailable for the first network device, or resources available for both the first network device and the second network device.

12. The non-transitory computer-readable storage medium according to claim 11,
wherein when the second network device rejects the use of the third time-domain resource and/or the third frequency-domain resource, the feedback information comprises: (i) the information indicating that the first interference avoidance indication information is rejected, (ii) the rejection cause, and (iii) the interference avoidance suggestion information different from the first interference avoidance indication information.

13. The non-transitory computer-readable storage medium according to claim 9, wherein upon the receipt of the interference avoidance suggestion information, the signal interference avoidance method further comprises:
determining second interference avoidance indication information in accordance with the interference avoidance suggestion information, the second interference avoidance indication information comprising at least one of resource indication information about a fourth time-domain resource and/or a fourth frequency-domain resource, and resource indication information about time-domain resources and/or frequency-domain resources which are used by the UE in each cell; and
transmitting the second interference avoidance indication information to the second network device, wherein the second interference avoidance indication information is used to enable the second network device to communicate with the UE through the fourth time-domain resource and/or the fourth frequency-domain resource.

14. The non-transitory computer-readable storage medium according to claim 9, wherein the first interference avoidance indication information further comprises resource indication information about the first time-domain resource and/or the first frequency-domain resource,
wherein prior to transmitting the first interference avoidance indication information to the second network device, the signal interference avoidance method further comprises:
determining a fifth time-domain resource and/or a fifth frequency-domain resource used by the second network device when self-interference occurs for the UE; and
determining the first time-domain resource and/or the first frequency-domain resource in accordance with the fifth time-domain resource and/or the fifth frequency-domain resource.

15. The non-transitory computer-readable storage medium according to claim 14, wherein the first interference avoidance indication information further comprises at least one of the identification information about each cell where the UE is located, resource indication information about time-domain resources and/or frequency-domain resources which are used by the UE in each cell, a start time of the communication with the UE through the first time-domain resource and/or the first frequency-domain resource, and a stop time of the communication with the UE through the first time-domain resource and/or the first frequency-domain resource.

16. The non-transitory computer-readable storage medium according to claim 9, wherein subsequent to transmitting the first interference avoidance indication information to the second network device, the signal interference avoidance method further comprises:
transmitting avoidance interruption indication information to the second network device, when self-interference for the UE disappears or is attenuated, wherein the avoidance interruption indication information is used to enable the second network device to stop the communication with the UE through the first time-domain resource and/or the first frequency-domain resource.

17. A non-transitory computer-readable storage medium storing therein a computer program, wherein the computer program is executed by a processor of a second network device so as to implement a signal interference avoidance method, the signal interference avoidance method comprising:
receiving first interference avoidance indication information from a first network device, the first interference avoidance indication information being transmitted by the first network device; and
communicating with a UE through a first time-domain resource and/or a first frequency-domain resource in accordance with the first interference avoidance indication information,
wherein the first interference avoidance indication information comprises identification information about the UE,
wherein subsequent to receiving the first interference avoidance indication information from the first network device, the signal interference avoidance method further comprises: transmitting feedback information to the first network device with respect to the first interference avoidance indication information;
wherein the feedback information comprises: (i) information indicating that the first interference avoidance indication information is rejected, (ii) a rejection cause, and (iii) interference avoidance suggestion information different from the first interference avoidance indication information; and
wherein the interference avoidance suggestion information comprises at least one of the identification information about the UE, identification information about each cell where the UE is located, resource indication information about time-domain resources and/or frequency-domain resources for the UE in each cell, resource indication information about a second time-domain resource and/or a second frequency-domain resource, a start time of a communication with the UE through the second time-domain resource and/or the second frequency-domain resource, and a stop time of the communication with the UE through the second time-domain resource and/or the second frequency-domain resource.

18. The non-transitory computer-readable storage medium according to claim 17, wherein prior to receiving the first interference avoidance indication information from the first network device, the signal interference avoidance method further comprises:
receiving resource indication information about a third time-domain resource and/or a third frequency-domain resource from the first network device.

19. The non-transitory computer-readable storage medium according to claim 18, wherein the third time-domain resource and/or the third frequency-domain resource comprise resources available for the first network device and unavailable for the second network device, or resources available for the second network device and unavailable for the first network device, or resources available for both the first network device and the second network device.

20. The non-transitory computer-readable storage medium according to claim 19,
wherein when the second network device rejects the use of the third time-domain resource and/or the third frequency-domain resource, the feedback information comprise: (i) the information indicating that the first interference avoidance indication information is rejected, (ii) the rejection cause, and (iii) the interference avoidance suggestion information different from the first interference avoidance indication information.

\* \* \* \* \*